July 18, 1933.  M. SCHULZE  1,918,351

HÆMACYTOMETER

Filed July 22, 1931

Inventor:
Max Schulze

Patented July 18, 1933

UNITED STATES PATENT OFFICE

MAX SCHULZE, OF BERLIN-STEGLITZ, GERMANY

HÆMACYTOMETER

Application filed July 22, 1931, Serial No. 552,460, and in Germany August 4, 1930.

Blood corpuscles are usually counted by means of hæmacytometers divided into squares on the metric system, generally 400 squares to a millimetre. In order to obtain correct results it is usual to arrange the squares in groups, and this is effected by means of auxiliary grooves run through the centre of the outer squares of each group. The better to distinguish between the principal and the auxiliary grooves, the latter are placed two or three together at a distance from one another of 0.005–0.025 millimetre.

The employment of the auxiliary grooves complicates the manufacture of the instrument and has moreover the disadvantage of preventing the uniform distribution of the blood corpuscles over the surface thereof. The average size of a blood corpuscle is $7.9\mu$ although some corpuscles may measure as much as $9.3\mu$ and others as little as $6.5\mu$. When three auxiliary grooves are placed together, the spacing of the grooves equals substantially the size of the blood corpuscles, and the latter will therefore have a tendency to crowd about the grooves instead of distributing themselves over the entire field. This occurs to a minor degree even when the spacing of the grooves is as much as $25\mu$.

The object of the present invention is to maintain the group formation of the squares without the use of auxiliary grooves, and the invention consists in arranging the squares in isolated groups the bounding grooves of which are at a distance of at least 0.05 millimetre apart.

By this arrangement the unequal distribution of the blood corpuscles is obviated.

Figure 1:
Figure 2:
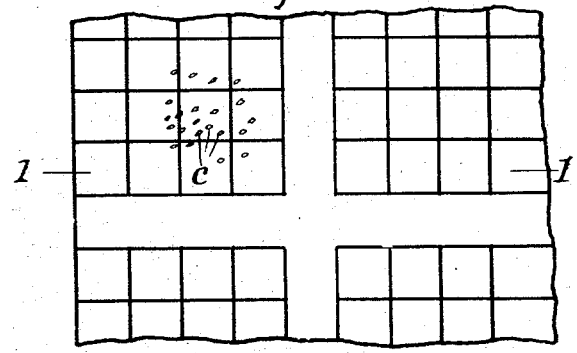
Figure 3:
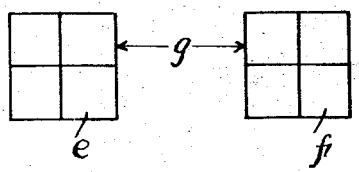

Fig. 1 of the accompanying drawing represents a section on an exaggerated scale, taken on the line 1—1 of Fig. 2 of a hæmacytometer according to the invention, Fig. 2 is a top view of Fig. 1, and Fig. 3 shows the grouping of the squares according to the invention, the groups being at the distance $g$ apart.

I claim:

A hæmacytometer comprising a plate having grooves on its surface forming groups of squares, contiguous groups being separated by a blank space no less than 0.05 mm. wide.

MAX SCHULZE.